United States Patent
Viswanath et al.

(10) Patent No.: US 11,348,467 B2
(45) Date of Patent: May 31, 2022

(54) SYSTEM AND METHOD FOR TUNING TO COMMUNICATION FREQUENCIES FOR SINGLE AND MULTI-TOWER AIRPORTS

(71) Applicant: HONEYWELL INTERNATIONAL INC., Morris Plains, NJ (US)

(72) Inventors: Mithun Viswanath, Bangalore (IN); Rashmi A, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 130 days.

(21) Appl. No.: 16/579,534

(22) Filed: Sep. 23, 2019

(65) Prior Publication Data

US 2021/0090443 A1    Mar. 25, 2021

(51) Int. Cl.
G08G 5/00 (2006.01)
H04W 72/04 (2009.01)

(52) U.S. Cl.
CPC ......... G08G 5/0013 (2013.01); G08G 5/0021 (2013.01); H04W 72/0453 (2013.01)

(58) Field of Classification Search
CPC .... G08G 5/0013; G08G 5/0021; G08G 5/025; H04W 72/0453
See application file for complete search history.

(56) References Cited

U.S. PATENT DOCUMENTS

| | | |
|---|---|---|
| 6,282,417 B1 | 8/2001 | Ward |
| 6,473,675 B2 | 10/2002 | Sample |
| 7,693,621 B1 | 4/2010 | Chamas |
| 7,881,832 B2 | 2/2011 | Komer et al. |
| 2002/0065586 A1* | 5/2002 | Sample ................... G01S 1/045 701/3 |
| 2015/0261379 A1 | 9/2015 | Kneuper et al. |
| 2017/0188222 A1* | 6/2017 | Cooper ................. H04W 24/08 |
| 2018/0134410 A1 | 5/2018 | Fymat |

FOREIGN PATENT DOCUMENTS

| | | |
|---|---|---|
| EP | 3131081 A2 | 8/2016 |
| WO | 2011/128835 A2 | 10/2011 |

OTHER PUBLICATIONS

Garmin, G1000 Integrated Flight Deck Pilot's Guide—Instructor's Reference, Aug. 2005.

* cited by examiner

*Primary Examiner* — Elton Williams
(74) *Attorney, Agent, or Firm* — Lorenz & Kopf, LLP

(57) ABSTRACT

A system in an aerial vehicle for aiding a flight crew with aerial vehicle communication around an airdrome is provided. The system comprises one or more processors configured by programming instructions on non-transient computer readable media. The system is configured to: cause, for each control tower (CT) at the airdrome, an interactive CT icon corresponding to the CT to be displayed on an airport moving map display (AMMD) or airdrome map that depicts the ground space at the airdrome; receive flight crew selection of a CT via selection of the CT icon corresponding to the selected CT; generate a CT frequency list comprising a listing of frequencies associated with the airdrome and the selected CT and not including frequencies not associated with the selected CT; and cause the CT frequency list to be displayed on the AMMD or airdrome map responsive to selection of the selected CT icon.

19 Claims, 7 Drawing Sheets

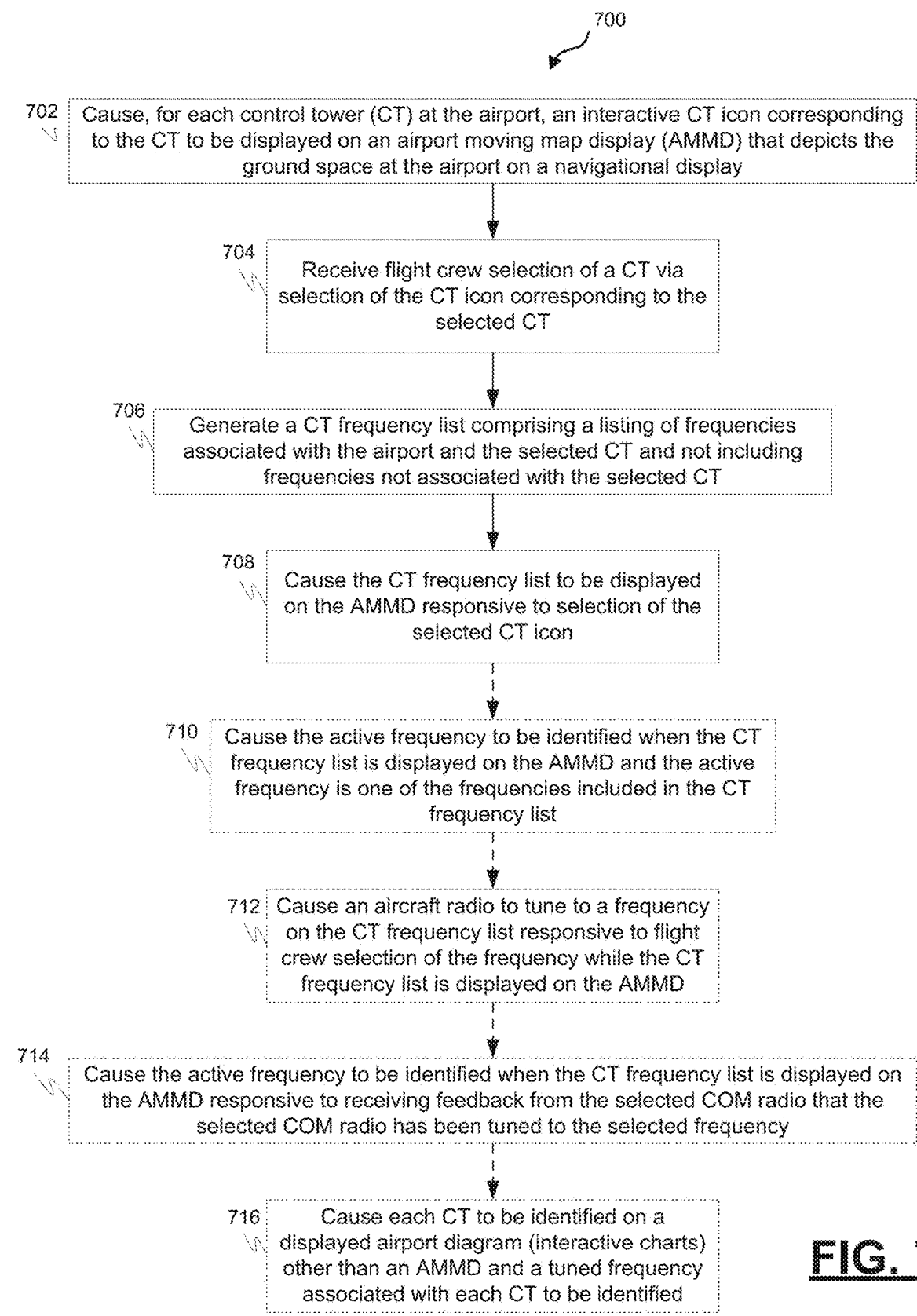

SYSTEM AND METHOD FOR TUNING TO COMMUNICATION FREQUENCIES FOR SINGLE AND MULTI-TOWER AIRPORTS

TECHNICAL FIELD

Embodiments of the subject matter described herein relate generally to systems and methods for assisting flight crew with tuning to an appropriate communication frequency. More particularly, embodiments of the subject matter relate to assisting flight crew with tuning to an appropriate communication frequency using an airport moving map display.

BACKGROUND

Communication between a flight crew and air traffic control (ATC) begins before aircraft engines are turned on before takeoff and ends after the aircraft arrives at the gate after safely landing, the engines are shut down, and the parking brake is set. The flight crew must communicate with multiple ATC entities (e.g., ground control, tower control, air control clearance delivery, approach and terminal control, and area control) and other services (e.g., ATIS (automatic terminal information service), AWOS (automated weather observing system), UNICOM (universal communications), emergency, and common traffic advisory frequency (CTAF) at non-towered airports) by tuning to an appropriate frequency. The flight crew often switches its communications between multiple ATC entities, especially in the vicinity of an airport terminal during a period of high flight crew workload, as ATC hands off responsibility from one entity to another as the aircraft progresses from one phase to another. For example, ground control may have responsibility for push back and taxi to runway, then tower control may have responsibility for takeoff clearance, and then area control may have responsibility thereafter. Each of these entities may communication using different COM frequencies and the flight crew must tune to the appropriate frequency at the appropriate time. During approach, the flight crew may tune to the ATIS frequency then establish communication, in turn, with approach and terminal control, tower control, and ground control until the aircraft is on the ramp and reaches the apron. In addition to ATC, the flight crew may tune to other frequencies in the vicinity of an airport for communications from services such as AWOS, UNICOM, and CTAF.

The complexity increases in multi-tower environments where specific control towers control certain geographical areas of an airport. The flight crew will be expected to communicate with the appropriate tower and may have to switch between different control towers during operation. The flight crew is responsible for tuning to the appropriate communication frequency at the appropriate time to establish communication with the appropriate ATC entity or service. At times, the flight crew may manually tune to an incorrect communication frequency, which can lead to a number of different types of mishaps.

Hence, it is desirable to provide a system and method for assisting a flight crew with tuning to the appropriate communication frequency. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system in an aerial vehicle (e.g., aircraft, helicopter, or other) for aiding a flight crew with aerial vehicle communication around an airport is provided. The system comprises one or more processors configured by programming instructions on non-transient computer readable media. The system is configured to: cause, for each control tower (CT) at the airport, an interactive CT icon corresponding to the CT to be displayed on an airport moving map display (AMMD) that depicts the ground space at the airport; receive flight crew selection of a CT via selection of the CT icon corresponding to the selected CT; generate a CT frequency list comprising a listing of frequencies associated with the airport and the selected CT and not including frequencies not associated with the selected CT; and cause the CT frequency list to be displayed on the AMMD responsive to selection of the selected CT icon.

A processor implemented method in an aerial vehicle (e.g., aircraft, helicopter, or other) for aiding flight crew with communication around an airport is provided. The method includes: causing, for each control tower (CT) at the airport, an interactive CT icon corresponding to the CT to be displayed on an airport moving map display (AMMD) that depicts the ground space at the airport; receiving flight crew selection of a CT via selection of the CT icon corresponding to the selected CT; generating a CT frequency list comprising a listing of frequencies associated with the airport and the selected CT and not including frequencies not associated with the selected CT; and causing the CT frequency list to be displayed on the AMMD responsive to selection of the selected CT icon.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein:

FIG. 7 is a process flow chart depicting an example processor-implemented process in an aerial vehicle for aiding flight crew with aerial vehicle communication around an airport.

DETAILED DESCRIPTION

Figure 1:
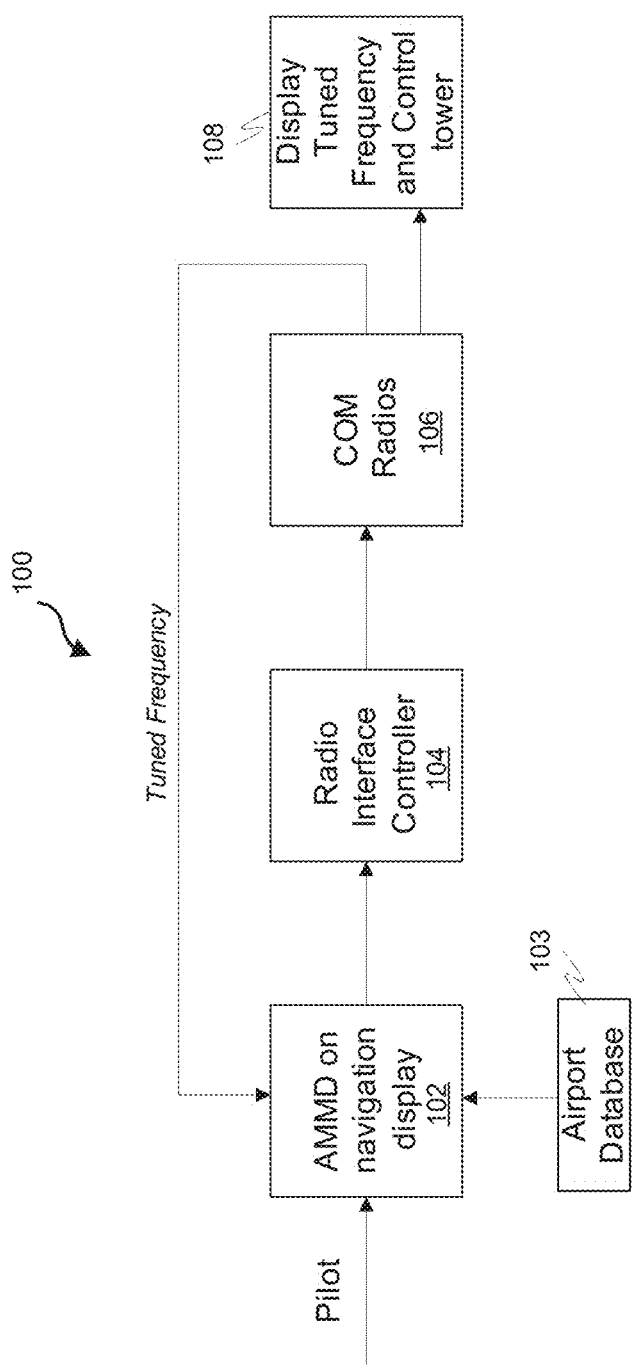
FIG. 1 is a block diagram depicting an example communication environment in an aerial vehicle, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, methods and articles in an aerial vehicle (e.g., aircraft, helicopter, or other) for assisting a flight crew with connecting to an appropriate communication channel (e.g., tuning to appropriate frequencies or dialing an appropriate telephone number) at or around an airdrome. An airdrome is a location from which aerial vehicle flight operations take place, regardless of whether they involve air cargo, passengers, or neither. Aerodromes include small general aviation airfields, large commercial airports, and military airbases. The disclosed apparatus, systems, techniques, methods and articles can build a list of communication channel identifiers (e.g., frequencies or telephone numbers) that are specific to the physical controller (e.g., air traffic control (ATC)) entities and services that service the geographical area in which the aerial vehicle is traversing at or around an airdrome. The apparatus, systems, techniques and articles provided herein can interact with an airport moving map display (AMMD) to assist the flight crew with automatically tuning to a required communication (COM) frequency.

Communication between a flight crew and ATC begins before aerial vehicle engines are turned on before takeoff and ends after the aerial vehicle arrives at the gate after safely landing, the engines are shut down, and the parking brake is set. The flight crew must communicate with multiple ATC entities (e.g., ground control, tower control, air control clearance delivery, approach and terminal control, and area control) and other services (e.g., ATIS (automatic terminal information service), AWOS (automated weather observing system), UNICOM (universal communications), emergency, and common traffic advisory frequency (CTAF) at non-towered airports) by tuning to an appropriate frequency. The flight crew often switches its communications between multiple ATC entities, especially in the vicinity of an airport terminal during a period of high flight crew workload, as ATC hands off responsibility from one entity to another based on flight crew requests. For example, ground control may have responsibility for push back and taxi to runway, then tower control may have responsibility for takeoff clearance, and then area control may have responsibility thereafter. Each of these entities may communication using different COM frequencies and the flight crew must tune to the appropriate frequency at the appropriate time. During approach, the flight crew may tune to the ATIS frequency then establish communication, in turn, with approach and terminal control, tower control, and ground control until the aerial vehicle is on the ramp and reaches the apron. In addition to ATC, the flight crew may tune to other frequencies in the vicinity of an airport for communications from services such as AWOS, UNICOM, and CTAF.

FIG. 1 is a block diagram depicting an example communication environment 100 in an aerial vehicle. The example communication environment includes a navigational display 102, an airport database 103, a radio interface controller 104, COM radios 106 and a cockpit display 108. The flight crew may view a map of an airport at which the aerial vehicle may depart or land via the navigational display 102. The airport database 103 may include a listing of all of the communication frequencies that are used for the different ATC entities and services associated with the airport. The radio interface controller 104 can cause the COM radios 106 to tune to the one or more communication frequencies on which the flight crew can communicate with the different ATC entities and services associated with the airport. Other maps or diagrams regarding the airport layout may be displayed on the cockpit display 108.

The aerial vehicle in this example includes a system for aiding the flight crew with tuning to an appropriate aerial vehicle communication frequency. The example system is configured to retrieve, from the airport database 103, a listing of all of the communication frequencies that are used for the different ATC entities and services associated with the airport and segregate the frequencies based on geography and control tower. The system is configured to identify the control tower and communication frequencies related to ATC entities and services within the geographical area covered by that control tower. Thus, when an aerial vehicle enters a geographical area covered by a control tower, the system can provide the flight crew with the communication frequencies related to ATC entities and services within the geographical area covered by that control tower. If the flight crew selects a specific control tower, the system can also identify to the flight crew the communication frequencies related to ATC entities and services within the geographical area covered by that specific control tower.

The system is configured to provide the frequency information to the flight crew using an airport moving map display (AMMD) that depicts an airport diagram along with a depiction of a control tower, which may be displayed on the navigational display 102. The system is configured to allow the flight crew to select a control tower, display the communication frequencies associated with ATC entities and services connected to the selected control tower, select a displayed communication frequency, interface with the radio interface controller 104 to cause the COM radios 106 to tune to the selected communication frequency without requiring the flight crew to manually tune COM radios 106 to a communication frequency, receive feedback from the COM radios 106 regarding the communication frequency to which the COM radios are tuned, and display the tuned to communication frequency for flight crew review. The system is also configured to provide a visual indication of the communication frequency associated with each control tower on other maps or diagrams depicting the airport layout that may be displayed on the cockpit display 108. This system is configured to significantly reduce flight crew workload by eliminating manual tuning of communication frequency during each handoff from one ATC entity to another and can help prevent the flight crew from tuning to an incorrect frequency.

In summary, the system is configured to segregate communication frequencies used at airport based on the control tower responsible for distinct geographical areas around an airport; provide an indication to the flight crew to tune to an appropriate tower based on the aerial vehicle's geographical location; and provide an intuitive indication to the flight crew regarding the tower communication frequency to which the aerial vehicle is tuned.

Figure 2:
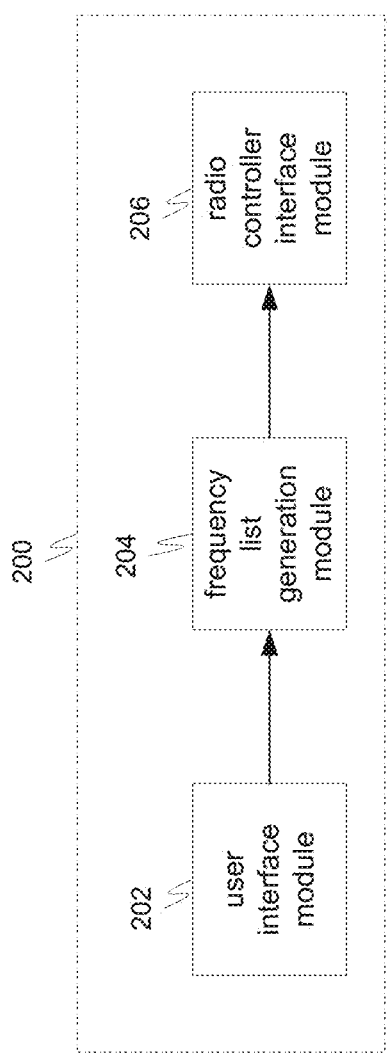
FIG. 2 is a block diagram depicting an example system in an aerial vehicle for aiding flight crew with tuning to appropriate aerial vehicle communication frequencies, in accordance with some embodiments.

FIG. 2 is a block diagram depicting an example system 200 in an aerial vehicle for aiding flight crew with tuning to appropriate aerial vehicle communication frequencies. The example system 200 includes a user interface module 202, a frequency list generation module 204, and a radio controller interface module 206.

The example system 200 includes a controller that is configured to implement the user interface module 202, frequency list generation module 204, and radio controller interface module 206. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example user interface module 202 is configured to cause the display on an aerial vehicle display of information relating to frequencies to be used at an airport from which an aerial vehicle containing the example system 200 will depart or at which the aerial vehicle will land. The example user interface module 202 is configured to retrieve a listing of frequencies authorized for use at the airport that has been segregated based on service type and location. For an airport having multiple control towers, a subset of the available communication frequencies may be assigned for each location at the airport under the control of a specific control tower (CT) at the airport. The example user interface module 202 is configured to retrieve the listing of frequencies that is specific to a location and control tower. The listing of frequencies will also be segregated based on service type. For example, the listing may identify Unicom (universal communications), CTAF (common traffic advisory frequency), GND (ground controller frequency), TWR (tower controller frequency), FBO (fixed-base operator frequency), weather radio, and weather advisory frequencies.

The example user interface module 202 is configured to cause the display of interactive control tower (CT) icons on an airport moving map display (AMMD) displayed on a navigational display in the cockpit of the aerial vehicle. The AMMD displays the aerial vehicle's current location at the center of a moving map that depicts the ground space at the airport. As the aerial vehicle moves around and new aerial vehicle coordinates are determined, the map moves to keep the aerial vehicle's position at the center of the display.

The interactive CT icons provided by the example user interface module 202 are selectable by the flight crew on the aerial vehicle. When an interactive CT icon is selected, the example user interface module 202 causes the display, over the AMMD, of a CT frequency list. The displayed CT frequency list includes the listing of frequencies authorized for use at the airport that are associated with the selected CT.

The example user interface module 202 is configured to cause the individual frequencies listed in a CT frequency list over the AMMD to be listed via selectable icons. When a listed frequency is selected by flight crew, the example user interface module 202 is configured to cause the selected frequency to become active if it is not already active.

If one of the displayed frequencies is active with an aerial vehicle radio when a CT frequency list is displayed, the example user interface module 202 is configured to identify the active and/or tuned to (i.e., active/tuned) frequency in some way. As an example, the example user interface module 202 may cause the active/tuned frequency to be identified via a graphical element positioned to highlight (e.g., a colored box positioned around) the displayed active/tuned frequency or by some other visible method.

If the frequency icon associated with one of the displayed frequencies is selected by flight crew while a CT frequency list is displayed, the example user interface module 202 is configured to identify the selected frequency after receiving feedback from an aerial vehicle radio that the selected frequency has become active. As an example, the example user interface module 202 may cause the selected frequency that has become active to be identified via a colored box positioned around the displayed active/tuned frequency or by some other visible method.

The example user interface module 202 is also configured to highlight the location of control towers on other airport diagrams (other than AMMD) displayed on cockpit displays.

For example, the example user interface module 202 is configured to highlight the location of control towers on interactive charts such as an airport diagram by causing a colored box to be drawn around each CT symbol on the airport diagram. The example user interface module 202 is also configured to identify on the displayed airport diagram each frequency to which the aerial vehicle is currently tuned which is associated with a CT. For example, the example user interface module 202 may identify on the displayed airport diagram a tuned to frequency by drawing a colored box around the tuned to frequency wherein the box color for the tuned to frequency and its associated CT are the same.

The example frequency list generation module 204 is configured to generate each CT frequency list. Each CT frequency list comprises a listing of frequencies associated with the airport and the selected CT and does not include frequencies not associated with the selected CT. To generate the CT frequency list, the example frequency list generation module 204 is configured to: extract a list of frequencies for the airport, for example, from an avionics database or other source; segregate the frequencies based on service and location (e.g., GND, TWR, FBO—fixed-base operator, Weather and Advisory); and add the segregated frequencies to a CT list associated with the location covered by the CT.

The radio controller interface module 206 is configured to cause an aerial vehicle radio to tune to a frequency on the CT frequency list responsive to flight crew selection of the frequency while the CT frequency list is displayed on the AMMD. The radio controller interface module 206 may accomplish this by instructing a radio interface controller to cause a flight crew selected communication (COM) radio to tune to the selected frequency and receiving feedback from the selected COM radio when the selected COM radio has been tuned to the selected frequency.

Figure 3:
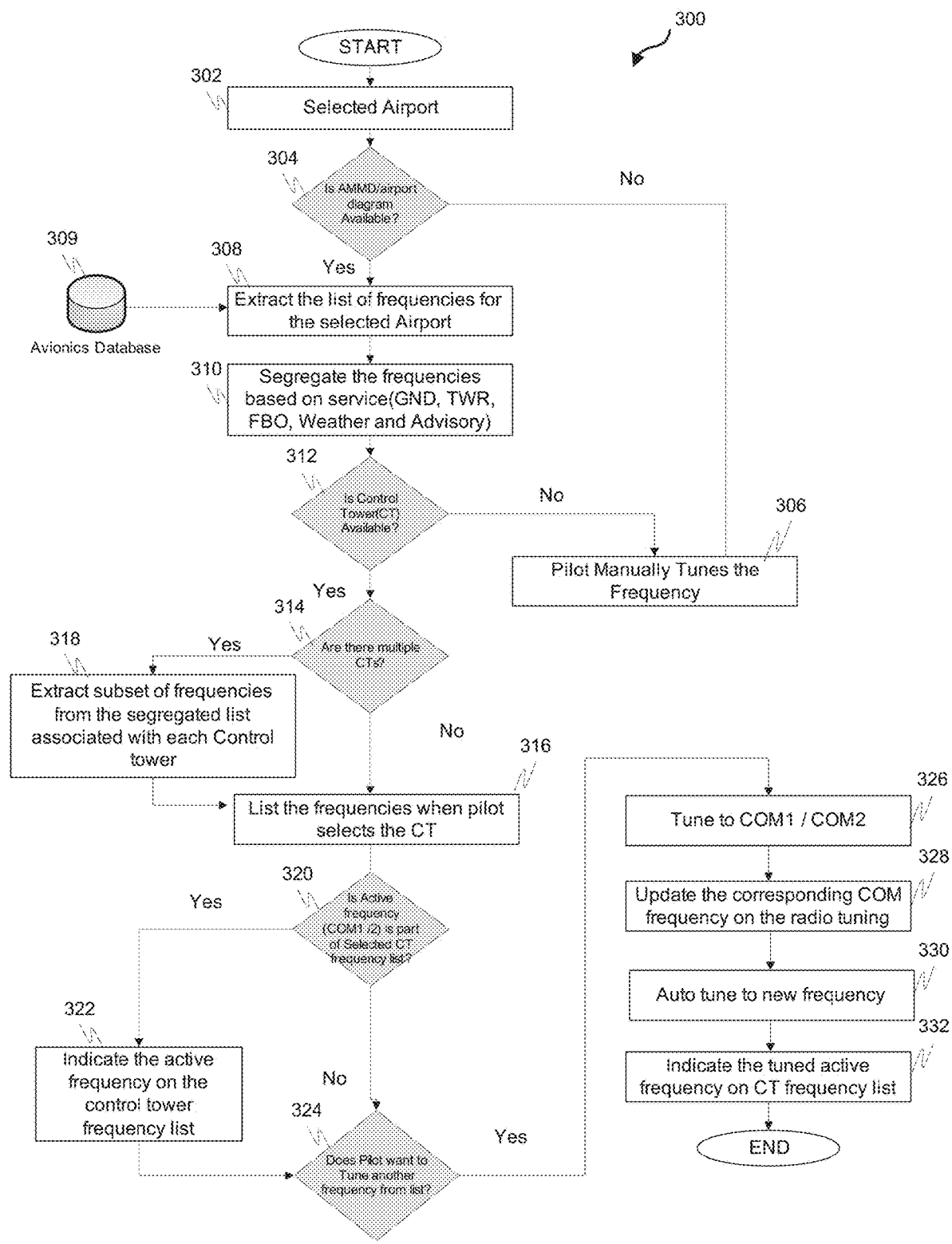
FIG. 3 is a process flow chart depicting an example process 300 in a processor-implemented system in an aerial vehicle for aiding flight crew with tuning a COMM radio to an appropriate aerial vehicle communication frequency, in accordance with some embodiments.

FIG. 3 is a process flow chart depicting an example process 300 in a processor-implemented system in an aerial vehicle for aiding flight crew with tuning a COM radio to an appropriate aerial vehicle communication frequency. The order of operation within the process 300 is not limited to the sequential execution as illustrated in the figure, but may be performed in one or more varying orders as applicable and in accordance with the present disclosure.

The example process 300 includes determining a selected airport (operation 302). This may involve automatically identifying the airport at which the aerial vehicle is located, for example, when the aerial vehicle is on the ground prior to takeoff. This may involve automatically identifying the airport to which the aerial vehicle is approaching for landing or the flight crew selecting the airport.

The example process 300 includes determining whether an airport moving map diagram (AMMD) or airport diagram is available (decision 304). If an AMMD/airport diagram is not available (no at decision 304), then the flight crew must manually tune a COM radio to a desired frequency (operation 306). If an AMMD/airport diagram is available (yes at decision 304), then the list of frequencies for the selected airport are extracted (operation 308). The list of frequencies may be extracted from an avionics database 309. The avionics database 309 may be local to the aerial vehicle or accessible from a remote location such as a cloud based server. The extracted frequencies are segregated based on service (operation 310). The services may include, for example, ground (GND), tower (TWR), FBO, weather and advisory, and others.

The example process 300 includes determining if the airport includes an available control tower (decision 312). If there is not an available control tower (no at decision 312), then the flight crew must manually tune a COM radio to a desired frequency (operation 306). If there is an available control tower (yes at decision 312), then a determination is made regarding whether there are multiple control towers (decision 314). If there are not multiple control towers (no at decision 314), then the system lists the frequencies when the flight crew selects the control tower via the AMMD (operation 316). If there are multiple control towers (yes at decision 314) then the subset of frequencies from the segregated list associated with each control tower is extracted to form a separate list for each control tower (operation 318) and the system lists the frequencies when the flight crew selects the control tower via the AMMD (operation 316).

The example process 300 includes determining if the active/tuned frequency on a COM radio is included on the displayed list of frequencies for the selected control tower (decision 320). If the active/tuned frequency is included on the displayed list of frequencies (yes at decision 320), then the active/tuned frequency is identified on the control tower frequency list in some manner (operation 322). For example, a box could be drawn around the active/tuned frequency, the active/tuned frequency could be displayed in bold type or colored type, or some other visual mechanism could be employed to identify the active/tuned frequency on the control tower frequency list.

If the active/tuned frequency is not included on the displayed list of frequencies (no at decision 320), or after identifying the active/tuned frequency on the control tower frequency list, then a determination is made regarding whether the flight crew would like to tune a COM radio to another frequency from the list (decision 324). If the flight crew would like to tune a COM radio to another frequency from the list (yes at decision 324), then a selection of the frequency to which to tune and a selection of the COM radio (e.g., COM1 or COM2) is received (operation 326). The system instructs the radio interface controller to tune the selected COM radio to the selected frequency (operation 328), the selected COM radio is tuned to the selected frequency automatically (operation 330) without the flight crew having to manually tune a COM radio to a frequency, the system receives feedback from the COM radio when the tuning to the selected frequency is complete and indicates the active tuned to frequency on the control tower frequency list (operation 332). The active, tuned-to frequency may be indicated on the control tower frequency list in a number of manners. For example, a box could be drawn around the active/tuned frequency, the active/tuned frequency could be displayed in bold type or colored type, or some other visual mechanism could be employed to identify the active/tuned frequency on the control tower frequency list.

Figure 4:
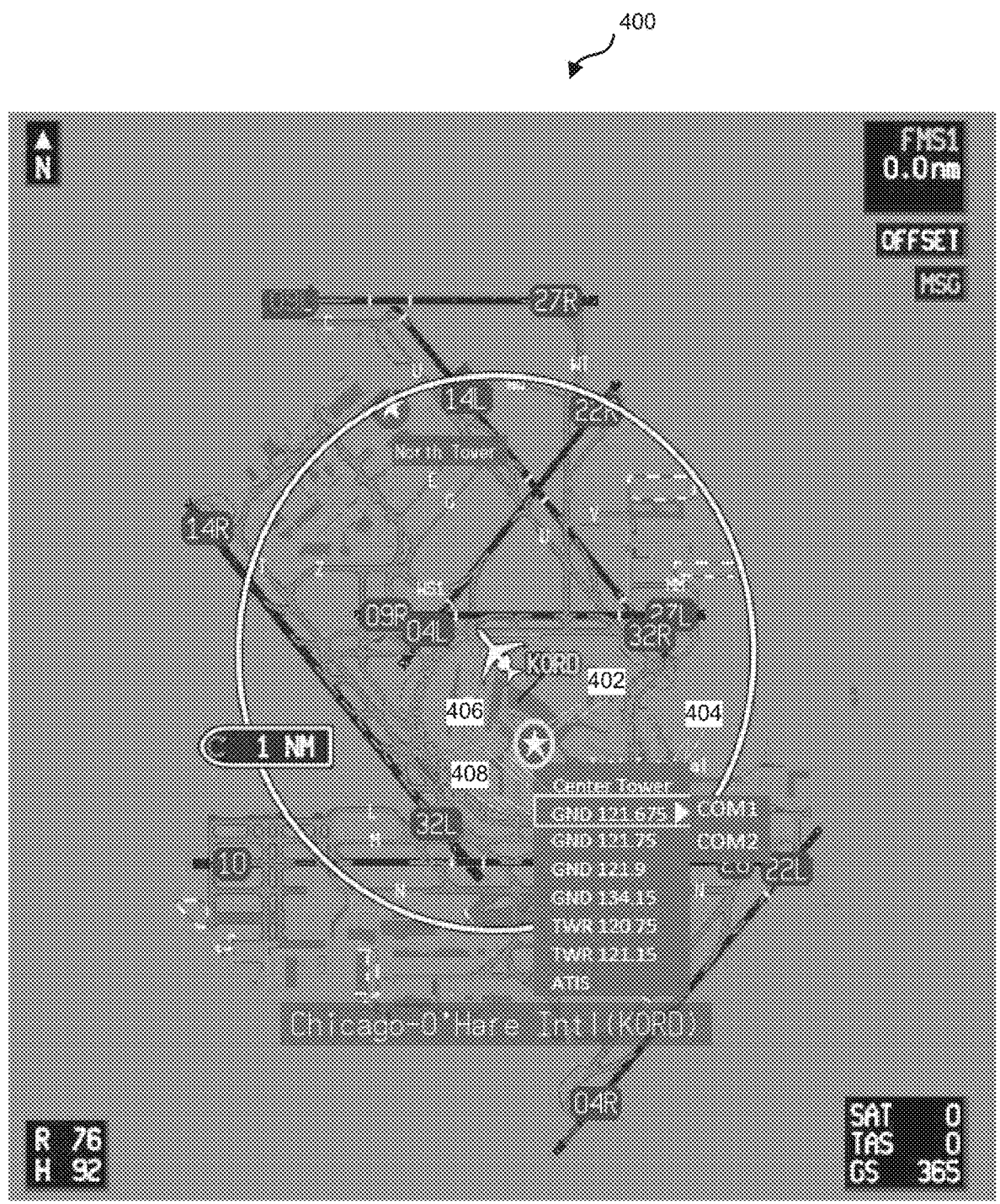
FIG. 4 is a diagram depicting an example AMMD that shows example frequencies associated with a selected control tower, in accordance with some embodiments.

FIG. 4 is a diagram depicting an example AMMD 400 that shows example frequencies associated with a selected control tower. In this example, a center tower 402 has been selected, and displayed is a listing of frequencies 404 associated with the center tower 402. The listing of frequencies 404 includes GND frequencies, TWR frequencies and an ATIS frequency. A GND frequency 406 has been selected and the selection is indicated by a box 408 around the selected frequency. Also shown are selection options for tuning one of the COM radios to the selected frequency.

Figure 5:
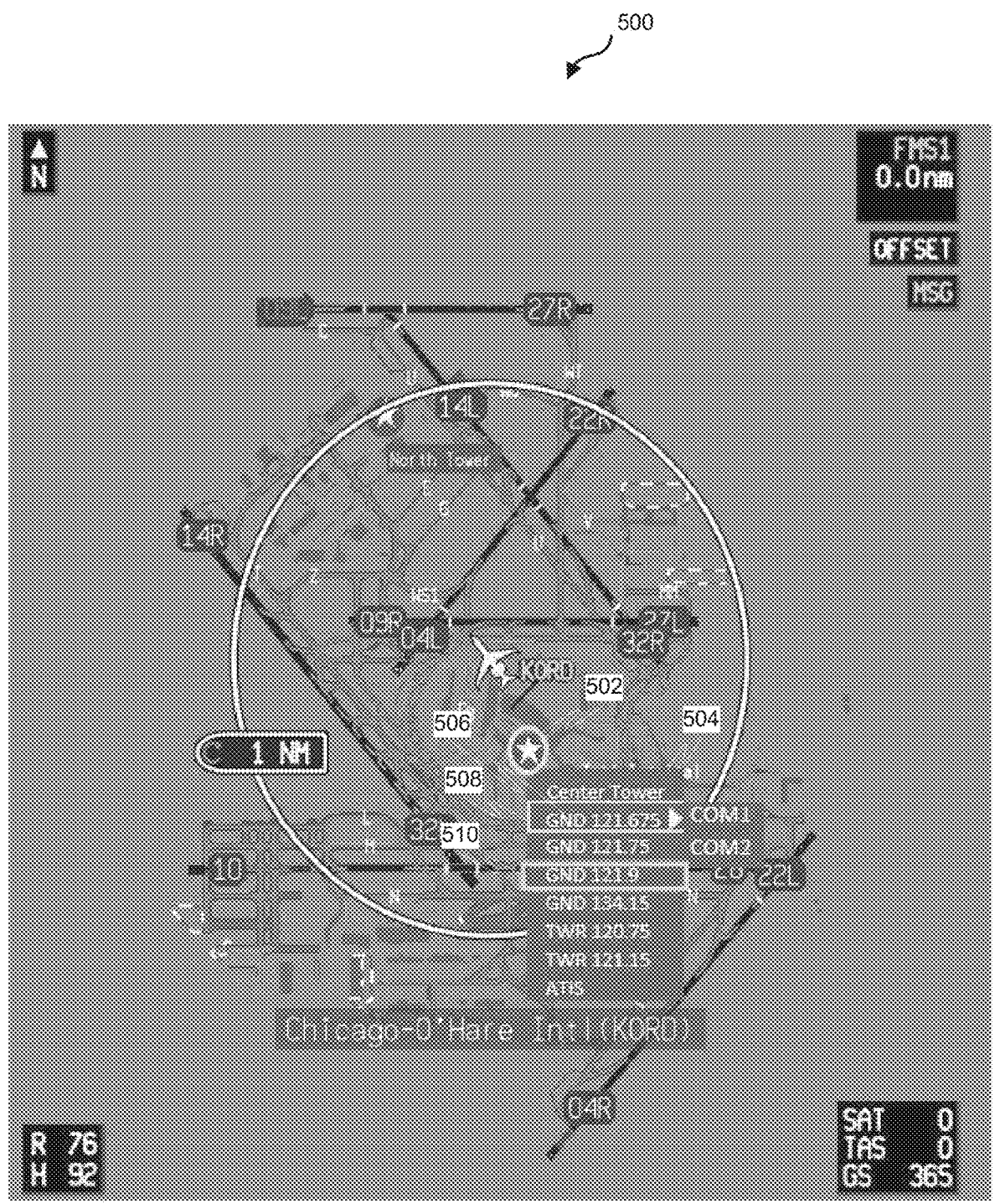
FIG. 5 is a diagram depicting an example AMMD that shows example frequencies associated with a selected control tower, in accordance with some embodiments.

FIG. 5 is a diagram depicting an example AMMD 500 that shows example frequencies associated with a selected control tower. In this example, a center tower 502 has been selected, and displayed is a listing of frequencies 504 associated with the center tower 502. The listing of frequencies 504 includes GND frequencies, TWR frequencies and an ATIS frequency. A GND frequency 506 has been selected and the selection is indicated by a box 508 around the selected frequency. Also shown are selection options for tuning one of the COM radios to the selected frequency. In addition, shown on the AMMD 500 is a box 510 around another of the GND frequencies. The box 510 indicates, in this example, that the encircled frequency is active.

Figure 6:
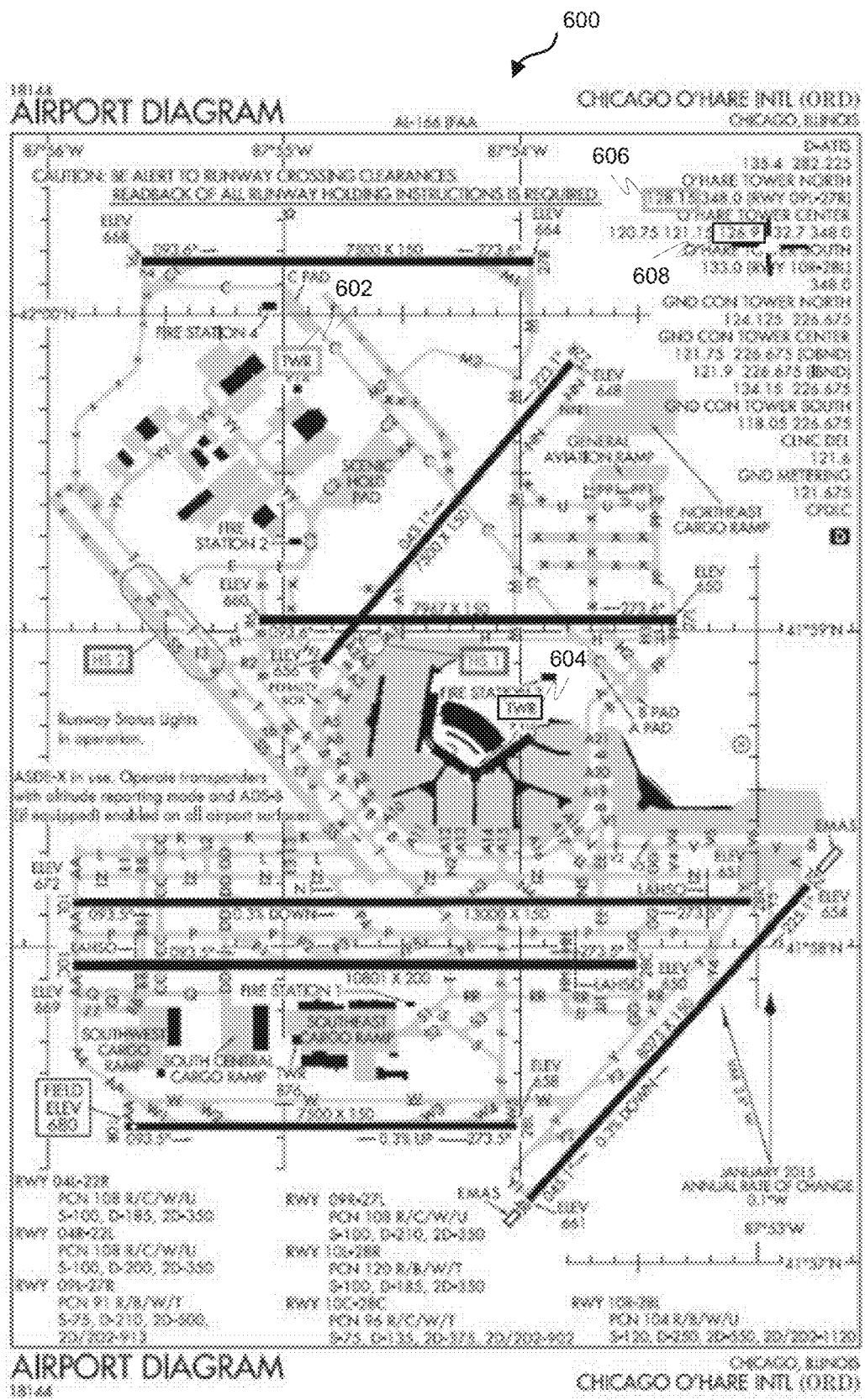
FIG. 6 is a diagram depicting an example airport diagram that has been annotated by the system to show control tower locations on the map and the active frequencies associated with the control towers, in accordance with some embodiments.

FIG. 6 is a diagram depicting an example airport diagram 600 that has been annotated by the system to show control tower locations on the map and the active frequencies associated with the control towers. In this example, a first control TWR 602 and a second control TWR 604 are identified by boxes that encircle the control tower symbols on the map. The example airport diagram 600 also includes a listing of frequencies associated with the airport. An active/tuned frequency associated with the first control TWR 602 is encircled by a box 606, and an active/tuned frequency associated with the second control TWR 604 is encircled by a box 608. To make it more clear that the box 606 is associated with TWR 602, the color of the box around TWR 602 could be the same as the color of the box 606. Similarly, to make it more clear that the box 608 is associated with TWR 604, the color of the box around TWR 604 could be the same as the color of the box 608 and different from the color of boxes 602 and 606.

FIG. 7 is a process flow chart depicting an example processor-implemented process 700 in an aerial vehicle for aiding flight crew with aerial vehicle communication around an airport. The order of operation within the process 700 is not limited to the sequential execution as illustrated in the figure, but may be performed in one or more varying orders as applicable and in accordance with the present disclosure.

The example process 700 includes causing, for each control tower (CT) at the airport, an interactive CT icon corresponding to the CT to be displayed on an airport moving map display (AMMD) that depicts the ground space at the airport on a navigational display (operation 702). The example process 700 includes receiving flight crew selection of a CT via selection of the CT icon corresponding to the selected CT (operation 704).

The example process 700 includes generating a CT frequency list comprising a listing of frequencies associated with the airport and the selected CT and not including frequencies not associated with the selected CT (operation 706). Generating the CT frequency list may include: extracting a list of frequencies for the airport from an avionics database or other source; segregating the frequencies based on service and location (e.g., GND, TWR, FBO, Weather and Advisory); and adding the segregated frequencies that correspond to the selected CT to the CT frequency list.

The example process 700 includes causing the CT frequency list to be displayed on the AMMD responsive to selection of the selected CT icon (operation 708). The example process 700 may include causing the active/tuned frequency to be identified when the CT frequency list is displayed on the AMMD and the active/tuned frequency is one of the frequencies included in the CT frequency list (operation 710). Causing the active/tuned frequency to be identified may include causing a graphical element configured to highlight (e.g., colored box) to be displayed around the active/tuned frequency.

The example process 700 may include causing an aerial vehicle radio to tune to a frequency on the CT frequency list responsive to flight crew selection of the frequency while the CT frequency list is displayed on the AMMD (operation 712). Causing an aerial vehicle radio to tune to a frequency on the CT frequency list may include instructing a radio interface controller to cause a flight crew selected communication (COM) radio to tune to the selected frequency and to received feedback from the selected COM radio when the selected COM radio has been tuned to the selected frequency.

The example process 700 may include causing the active/tuned frequency to be identified when the CT frequency list is displayed on the AMMD responsive to receiving feedback from the selected COM radio that the selected COM radio has been tuned to the selected frequency (operation 714). Causing the active/tuned frequency to be identified may comprise causing a graphical element configured to highlight (e.g., colored box) to be displayed around the active/tuned frequency.

The example process 700 may include causing each CT to be identified on a displayed airport diagram (interactive charts) other than an AMMD and a tuned frequency associated with each CT to be identified (operation 716). Causing each CT to be identified may include causing a graphical element configured to highlight (e.g., colored box) to be displayed around each CT symbol on the airport diagram. Causing a tuned frequency associated with each CT to be identified may include causing a colored box to be displayed around each frequency on airport diagram wherein the box color for the tuned frequency and the associated CT are the same.

Described herein are apparatus, systems, techniques and articles for assisting a flight crew with connecting to appropriate communication channels (e.g., tuning to appropriate frequencies) at or around an airdrome. The disclosed apparatus, systems, techniques, methods and articles can build a list of communication channel identifiers (e.g., frequencies or telephone numbers) that are specific to the physical controller (e.g., air traffic control (ATC)) entities and services that service the geographical area in which the aerial vehicle such as an aerial vehicle is traversing at or around an airport or other airdrome. The apparatus, systems, techniques and articles provided herein can interact with an airport moving map display (AMMD) or airdrome map to assist the flight crew with automatically tuning to a required communication (COM) frequency.

In one embodiment, a system in an aerial vehicle for aiding a flight crew with aerial vehicle communication around an airdrome is provided. The system comprises one or more processors configured by programming instructions on non-transient computer readable media. The system is configured to: cause, for each control tower (CT) at the airdrome, an interactive CT icon corresponding to the CT to be displayed on an airport moving map display (AMMD) or airdrome map displayed on a cockpit display that depicts the ground space at the airdrome; receive flight crew selection of a CT via selection of the CT icon corresponding to the selected CT; generate a CT frequency list comprising a listing of frequencies associated with the airdrome and the selected CT and not including frequencies not associated with the selected CT; and cause the generated frequency list to be displayed on the AMMD or airdrome map responsive to selection of the selected CT icon.

In one embodiment, to generate the CT frequency list the system is configured to: extract a list of frequencies for the airdrome from an avionics database or other source; segregate the frequencies based on service and location; and add the segregated frequencies that correspond to the selected CT to the CT frequency list.

In one embodiment, the system is further configured to cause an active and/or tuned (active/tuned) frequency to be identified when the CT frequency list is displayed on the AMMD or airdrome map and the active/tuned frequency is one of the frequencies included in the CT frequency list.

In one embodiment, to cause the active/tuned frequency to be identified the system is configured to cause a graphical element configured to highlight (e.g., colored box) to be displayed around the active/tuned frequency.

In one embodiment, the system is further configured to cause an aerial vehicle radio to tune to a frequency on the CT frequency list responsive to flight crew selection of the frequency while the CT frequency list is displayed on the AMMD or airdrome map.

In one embodiment, to cause an aerial vehicle radio to tune to a frequency on the CT frequency list, the system is configured to instruct a radio interface controller to cause a flight crew selected communication (COM) radio to tune to the selected frequency and to received feedback from the selected COM radio indicating the tuned to frequency when the selected COM radio has been tuned to the selected frequency.

In one embodiment, the system is further configured to cause the active/tuned frequency to be identified when the CT frequency list is displayed on the AMMD or airdrome map responsive to receiving feedback from the selected COM radio that the selected COM radio has been tuned to the selected frequency.

In one embodiment, to cause the active/tuned frequency to be identified the system is configured to cause a graphical element configured to highlight (e.g., colored box) to be displayed around the active/tuned frequency.

In one embodiment, the system is further configured to cause each CT to be identified on an interactive chart and a tuned frequency associated with each CT to be identified.

In one embodiment, to cause each CT to be identified on the interactive chart, the system is configured to cause a graphical element configured to highlight (e.g., colored box) to be displayed around each CT symbol on the interactive chart.

In one embodiment, to cause a tuned frequency associated with each CT to be identified, the system is configured to cause a graphical element configured to highlight (e.g., colored box) to be displayed around each frequency on the interactive chart wherein the color of the graphical elements configured to highlight for the tuned frequency and the associated CT are the same.

In one embodiment, the interactive chart comprises an airport diagram.

In another embodiment, a processor-implemented method in an aerial vehicle for aiding flight crew with aerial vehicle communication around an airdrome is provided. The method comprises: causing, for each control tower (CT) at the airdrome, an interactive CT icon corresponding to the CT to be displayed on an airport moving map display (AMMD) or airdrome map displayed on a cockpit display that depicts the ground space at the airdrome; receiving flight crew selection of a CT via selection of the CT icon corresponding to the selected CT; generating a CT frequency list comprising a listing of frequencies associated with the airdrome and the selected CT and not including frequencies not associated with the selected CT; and causing the CT frequency list to be displayed on the AMMD or airdrome map responsive to selection of the selected CT icon.

In one embodiment, generating the CT frequency list comprises: extracting a list of frequencies for the airdrome from an avionics database or other source; segregating the frequencies based on service and location; adding the segregated frequencies that correspond to the selected CT to the CT frequency list.

In one embodiment, the method further comprises causing an active and/or tuned (active/tuned) frequency to be identified when the CT frequency list is displayed on the AMMD or airdrome map and the active/tuned frequency is one of the frequencies included in the CT frequency list.

In one embodiment, causing the active/tuned frequency to be identified comprises causing a graphical element configured to highlight (e.g., colored box) to be displayed around the active/tuned frequency.

In one embodiment, the method further comprises causing an aerial vehicle radio to tune to a frequency on the CT frequency list responsive to flight crew selection of the frequency while the CT frequency list is displayed on the AMMD or airdrome map.

In one embodiment, causing an aerial vehicle radio to tune to a frequency on the CT frequency list comprises instructing a radio interface controller to cause a flight crew selected communication (COM) radio to tune to the selected frequency and receiving feedback from the selected COM radio when the selected COM radio has been tuned to the selected frequency.

In one embodiment, the method further comprises causing the active/tuned frequency to be identified when the CT frequency list is displayed on the AMMD or airdrome map responsive to receiving feedback from the selected COM radio that the selected COM radio has been tuned to the selected frequency.

In one embodiment, causing the active/tuned frequency to be identified comprises causing a graphical element configured to highlight (e.g., colored box) to be displayed around the active/tuned frequency.

In one embodiment, the method further comprises causing each CT to be identified on an interactive chart and a tuned frequency associated with each CT to be identified.

In one embodiment, causing each CT to be identified on an interactive chart comprises causing a graphical element configured to highlight (e.g., colored box) to be displayed around each CT symbol on the interactive chart.

In one embodiment, causing a tuned frequency associated with each CT to be identified comprises causing a graphical element configured to highlight (e.g., colored box) to be displayed around each frequency on the interactive chart wherein the color of the graphical elements configured to highlight for the tuned frequency and the associated CT are the same.

In one embodiment, the interactive chart comprises an airport diagram.

In another embodiment, non-transient computer readable media encoded by programming instructions configurable to cause a processor to perform a method is provided. The method comprises: causing, for each control tower (CT) at the airdrome, an interactive CT icon corresponding to the CT to be displayed on an airport moving map display (AMMD) or airdrome map displayed on a cockpit display that depicts the ground space at the airdrome; receiving flight crew selection of a CT via selection of the CT icon corresponding to the selected CT; generating a CT frequency list comprising a listing of frequencies associated with the airdrome and the selected CT and not including frequencies not associated with the selected CT; and causing the CT frequency list to be displayed on the AMMD or airdrome map responsive to selection of the selected CT icon.

In one embodiment, generating the CT frequency list comprises: extracting a list of frequencies for the airdrome from an avionics database or other source; segregating the frequencies based on service and location; adding the segregated frequencies that correspond to the selected CT to the CT frequency list.

In one embodiment, the method further comprises causing an active and/or tuned (active/tuned) frequency to be identified when the CT frequency list is displayed on the AMMD or airdrome map and the active/tuned frequency is one of the frequencies included in the CT frequency list.

In one embodiment, causing the active/tuned frequency to be identified comprises causing a graphical element configured to highlight (e.g., colored box) to be displayed around the active/tuned frequency.

In one embodiment, the method further comprises causing an aerial vehicle radio to tune to a frequency on the CT frequency list responsive to flight crew selection of the frequency while the CT frequency list is displayed on the AMMD or airdrome map.

In one embodiment, causing an aerial vehicle radio to tune to a frequency on the CT frequency list comprises instructing a radio interface controller to cause a flight crew selected communication (COM) radio to tune to the selected frequency and receiving feedback from the selected COM radio when the selected COM radio has been tuned to the selected frequency.

In one embodiment, the method further comprises causing an active and/or tuned (active/tuned) frequency to be identified when the CT frequency list is displayed on the AMMD or airdrome map responsive to receiving feedback from the selected COM radio that the selected COM radio has been tuned to the selected frequency.

In one embodiment, causing the active/tuned frequency to be identified comprises causing a graphical element configured to highlight (e.g., colored box) to be displayed around the active/tuned frequency.

In one embodiment, the method further comprises causing each CT to be identified on an interactive chart and a tuned frequency associated with each CT to be identified.

In one embodiment, causing each CT to be identified on the interactive chart comprises causing a graphical element configured to highlight (e.g., colored box) to be displayed around each CT symbol on airdrome diagram.

In one embodiment, causing a tuned frequency associated with each CT to be identified comprises causing a graphical element configured to highlight (e.g., colored box) to be displayed around each frequency on airdrome diagram wherein the color of the graphical elements configured to highlight for the tuned frequency and the associated CT are the same.

In one embodiment, the interactive chart comprises an airport diagram.

In another embodiment, a system in a transport vehicle for aiding with communication channel connections is provided. The system comprises one or more processors configured by programming instructions on non-transient computer readable media. The system is configured to: cause, for each geographical physical controller (PC), an interactive PC icon corresponding to the PC to be displayed on an interactive chart (e.g., airdrome diagram or airport moving map display) that depicts the ground space around which communications with a PC will take place; receive selection of a PC via selection of the PC icon corresponding to the selected PC; generate a PC communication channel identifier listing comprising a listing of communication channel identifiers associated with the ground space and the selected PC and not including communication channel identifiers not associated with the selected PC; and cause the generated communication channel identifier listing to be displayed on the interactive chart responsive to selection of the selected PC icon.

In one embodiment, a communication channel identifier comprises a communication frequency and/or a telephone number.

In one embodiment, to generate the PC communication channel identifier listing the system is configured to: extract a list of communication channel identifiers for the ground space around which communications with a PC will take place from an avionics database or other source; segregate the communication channel identifiers based on service and location; and add the segregated communication channel identifiers that correspond to the selected PC to the PC communication channel identifier listing.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system in an aerial vehicle for aiding a flight crew with aerial vehicle communication around an airdrome, the system comprising one or more processors configured by programming instructions on non-transitory computer readable media, the system configured to:
   signal a cockpit display to display an airport map that depicts an airport layout including a plurality of control towers located at an airport, the airport map comprising an airport moving map display (AMMD) or an airport chart;
   cause a plurality of interactive control tower (CT) icons to be displayed on the airport map with a separate CT icon for each of the plurality of CTs depicted on the airport map;
   retrieve, from an airport database, a listing of communication frequencies that are available for use with different air traffic control (ATC) entities and services associated with the airport;
   segregate the communication frequencies based on geography and CT;
   receive flight crew selection of a CT via selection of the CT icon corresponding to the selected CT;
   extract a subset of communication frequencies from the listing of communication frequencies that are associated with the selected CT; and
   signal the cockpit display to display the subset of communication frequencies on the airport map responsive to selection of the selected CT icon.

2. The system of claim 1, further configured to cause an active and/or tuned (active/tuned) frequency to be identified as already tuned when the subset of communication frequencies are displayed on the airport map and the active/tuned frequency is one of the frequencies included in the subset of communication frequencies.

3. The system of claim 2, wherein to cause the active/tuned frequency to be identified as already tuned, the system is configured to cause a graphical element configured to highlight to be displayed around the active/tuned frequency.

4. The system of claim 1, further configured to cause an aerial vehicle radio to tune to a frequency in the subset of communication frequencies responsive to flight crew selection of the frequency while the subset of communication frequencies are displayed on the airport map.

5. The system of claim 4, further configured to instruct a radio interface controller to cause a flight crew selected communication (COM) radio to tune to the selected frequency and to receive feedback from the selected COM radio indicating success in tuning to the selected frequency when the selected COM radio has been tuned to the selected frequency.

6. The system of claim 5, further configured to provide an indication of success in tuning to the selected frequency to be displayed on the airport map responsive to receiving feedback from the selected COM radio that the selected COM radio has been tuned to the selected frequency.

7. The system of claim 6, wherein the indication of success comprises a graphical element configured to highlight being displayed around the active/tuned frequency.

8. The system of claim 1, further configured to cause each CT to be identified on an interactive chart and a tuned frequency associated with each CT to be identified.

9. The system of claim 8, wherein to cause each CT to be identified on the interactive chart, the system is configured to cause a graphical element configured to highlight to be displayed around each CT symbol on the interactive chart; and wherein to cause a tuned frequency associated with each CT to be identified, the system is configured to cause a graphical element configured to highlight to be displayed around each frequency on the interactive chart wherein the color of the graphical element configured to highlight for the tuned frequency and the associated CT are the same.

10. The system of claim 8, wherein the interactive chart comprises an airport diagram.

11. A processor-implemented method in an aerial vehicle for aiding flight crew with aerial vehicle communication around an airdrome, the method comprising:
   signaling a cockpit display to display an airport map that depicts an airport layout including a plurality of control towers located at an airport, the airport map comprising an airport moving map display (AMMD) or an airport chart;
   causing a plurality of interactive control tower (CT) icons to be displayed on the airport map with a separate CT icon for each of the plurality of CTs depicted on the airport map;
   retrieving, from an airport database, a listing of communication frequencies that are available for use with different air traffic control (ATC) entities and services associated with the airport;

segregating the communication frequencies based on geography and CT;

receiving flight crew selection of a CT via selection of the CT icon corresponding to the selected CT;

extracting a subset of communication frequencies from the listing of communication frequencies that are associated with the selected CT; and signaling the cockpit display to display the subset of communication frequencies on the airport map responsive to selection of the selected CT icon.

12. The method of claim 11, further comprising causing an active and/or tuned (active/tuned) frequency to be identified as already tuned when the CT frequency list is displayed on the airport map and the active/tuned frequency is one of the frequencies included in the CT frequency list.

13. The method of claim 11, further comprising causing an aerial vehicle radio to tune to a frequency in the subset of communication frequencies responsive to flight crew selection of the frequency while the subset of communication frequencies is displayed on the airport map.

14. The method of claim 13, further comprising instructing a radio interface controller to cause a flight crew selected communication (COM) radio to tune to the selected frequency and receiving feedback from the selected COM radio indicating success in tuning to the selected frequency when the selected COM radio has been tuned to the selected frequency.

15. The method of claim 14, further comprising providing an indication of success in tuning to the selected frequency to be displayed on the airport map responsive to receiving feedback from the selected COM radio that the selected COM radio has been tuned to the selected frequency.

16. The method of claim 11, further comprising causing each CT to be identified on an interactive chart and a tuned frequency associated with each CT to be identified and wherein:

causing each CT to be identified on an interactive chart comprises causing a graphical element configured to highlight to be displayed around each CT symbol on the interactive chart; and causing a tuned frequency associated with each CT to be identified comprises causing a graphical element configured to highlight to be displayed around each frequency on the interactive chart wherein the color of the graphical elements configured to highlight for the tuned frequency and the associated CT are the same.

17. A system in a transport vehicle for aiding with communication channel connections, the system comprising one or more processors configured by programming instructions on non transitory computer readable media, the system configured to:

signal a cockpit display to display an airport map that depicts an airport layout including a plurality of geographical physical controllers located at an airport, the airport map comprising an airport moving map display (AMMD) or an airport chart;

cause a plurality of interactive physical controller (PC) icons to be displayed on the airport map with a separate PC icon for each of the plurality of PCs depicted on the airport map;

retrieve, from an airport database, a listing of communication channel identifiers that are available for use with different air traffic control (ATC) entities and services associated with the airport;

segregate the communication channel identifies based on geography and CT;

receive selection of a PC via selection of the PC icon corresponding to the selected PC;

extract a subset of communication channel identifiers from the listing of communication channel identifiers that are associated with the selected CT; and signal the cockpit display to display the subset of communication channel identifiers responsive to selection of the selected PC icon.

18. The system of claim 17, wherein a communication channel identifier comprises a telephone number.

19. The system of claim 17, wherein a communication channel identifier comprises a communication frequency.

* * * * *